United States Patent [19]

Whitfield et al.

[11] 4,299,715

[45] Nov. 10, 1981

[54] METHODS AND MATERIALS FOR CONDUCTING HEAT FROM ELECTRONIC COMPONENTS AND THE LIKE

[76] Inventors: Fred J. Whitfield, 1405 S. Village Way, Santa Ana, Calif. 92705; Arthur T. Doyel, Jr., 4402 Casa Oro, Yorba Linda, Calif. 92686

[21] Appl. No.: 896,177

[22] Filed: Apr. 14, 1978

[51] Int. Cl.$^3$ ............................. C09K 5/00; F28F 7/00
[52] U.S. Cl. ..................................... 252/74; 165/185; 165/DIG. 8
[58] Field of Search .................... 252/70, 74; 126/400; 165/185, DIG. 8, DIG. 7

[56] References Cited

U.S. PATENT DOCUMENTS

| | | | |
|---|---|---|---|
| 2,799,793 | 7/1957 | DeCain | 165/DIG. 8 |
| 2,887,628 | 5/1959 | Zierdt | 165/DIG. 8 |
| 3,013,104 | 12/1961 | Young | 165/185 |
| 3,249,680 | 5/1966 | Sheets et al. | 165/185 |
| 3,356,828 | 12/1967 | Furness | 126/400 X |
| 3,463,140 | 8/1969 | Rollor | 126/400 X |
| 3,463,161 | 8/1969 | Andrassy | 252/70 X |
| 3,603,106 | 9/1971 | Ryan | 126/400 X |
| 3,819,530 | 6/1974 | Ratledge et al. | 252/70 X |
| 3,823,089 | 7/1974 | Ryan | 252/70 |

FOREIGN PATENT DOCUMENTS 2368529  6/1978  France ................................ 252/70

Primary Examiner—Albert W. Davis
Assistant Examiner—Margaret A. Focarino
Attorney, Agent, or Firm—Grover A. Frater

[57] ABSTRACT

A heat conductive material in solid form which is readily excoriated whereby it can be applied by rubbing on the surface to which it is to be applied is formed, in the preferred form, by mixing finely divided heat conducting solids in a waxy material. That material is formed of waxes, or certain fats, and is solid in the range of normal room temperatures. In preferred form it becomes molten at temperatures in that range just above normal room temperature at which heat generating electronic semi-conductor devices often operate.

The mixture is applied at normal room temperature by rubbing, or at elevated temperature by painting. It is applied to the surfaces to be mated and across which heat is to be conducted whereupon the surfaces are mated with the coating between them.

2 Claims, 11 Drawing Figures

METHODS AND MATERIALS FOR CONDUCTING HEAT FROM ELECTRONIC COMPONENTS AND THE LIKE

This invention relates to improved methods and materials for removing heat by conduction, particularly from solid state and other electronic devices.

BACKGROUND OF THE INVENTION

Some electronic components, particularily solid state active devices such as diodes, transistors, and integrated circuitry, are adversely affected by heat. Their electrical characteristics undergo large relative change at temperatures in the range just above room temperatures. As a consequence, it is common in the design of electronic apparatus to attempt to keep the temperature of such devices as cool as possible. They often generate heat at a rate that requires conduction cooling rather than mere convection cooling. Heat is conducted from the device to a heat sink which is cooled by convection and radiation. The effectiveness of the attempt to move heat from the device to the heat sink depends in part upon the cross-sectional area of the conductive path and that depends in part upon the degree of smoothness of the surfaces at the interface between the device and its sink. Heat sinks are usually made of metal. When the device must be insulated electrically from the sink, a layer of mica or other insulating material is interposed between them. In that case, the effective area of the heat conducting path depends upon the degree of smoothness of four surfaces rather than two. Any surface irregularities result in voids at the interface across which little heat is conducted.

To provide a high degree of smoothness at the interface is costly and may be impractical. The practical alternative has been to make a paste of a semi-liquid carrier and powders of heat conducting material. That paste is applied on one or more of the mating surfaces between the device and its heat sink and insulator.

The common vehicle is silicone grease. This works well, but it is messy and it contaminates equipment, work stations and clothing, and cannot be completely removed as it is not soluble. It is so messy that getting production workers to use it is an industry-wide problem. One alternative is to use a gasket of polymeric material, often silicone rubber, in which a heat conductive material has been suspended. That alternative works in some cases, but it requires the use of heavy fastening elements and heavy torquing which, in some cases, does not fill the resulting voids. This invention provides a better solution. A solution that costs less, works just as well, and that does not have the disadvantages of past materials and processes.

SUMMARY OF THE INVENTION

An object of the invention is to provide improved methods and materials for conducting heat from a heat generator, such as an electronic element, to a heat sink.

It is an object to provide an improved thermally conductive material that is easier to use and cleaner to use than prior materials. It is a related object to provide a material which may be used in solid form, or which is in solid form when used, but which will become fluid when performing its function.

Another object is to provide a thermally conductive material that is readily excoriated at normal room temperatures by rubbing and which will adhere to the surface on which it was rubbed.

It is another object to provide a novel method of protecting electronic devices by facilitating the transfer of heat from the device to a body which it engages in which method a body of a heat conductive material that is solid at room temperature and thereafter applying a layer of that material to at least one of the surfaces that will be engaged when the device and the body are connected. Thereafter, the device and the body are brought into engagement.

It is another object to provide a novel method of protecting electronic devices by facilitating the transfer of heat from the device to a body which it engages in which method a mixture is made of a heat conductive material in solid form with a waxy material that is solid at room temperature and thereafter applying a layer of that material to at least one of the surfaces that will be engaged when the device and the body are connected. Thereafter, the device and the body are brought into engagement.

A further object is to provide, for application to the surfaces of components of electronic apparatus, a heat conducting material including a substantially uniform mixture, in solid form, of finely divided solid heat conducting material and a waxy substance which is solid at room temperature. Still another object is to provide a gasket which has been impregnated with such a material.

Figure 7:
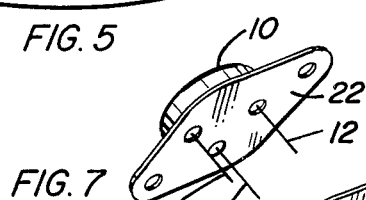
FIGS. 7 and 8 are isometric views of a semi-conductor device and an insulating washer, respectively.
Figure 10:
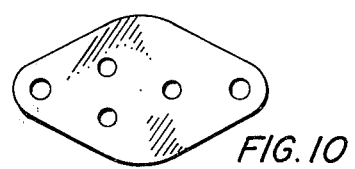
FIG. 10 is a top plan view of a gasket impregnated with a heat conducting material according to the invention.
Figure 8:
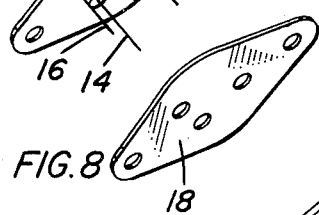
Figure 9:
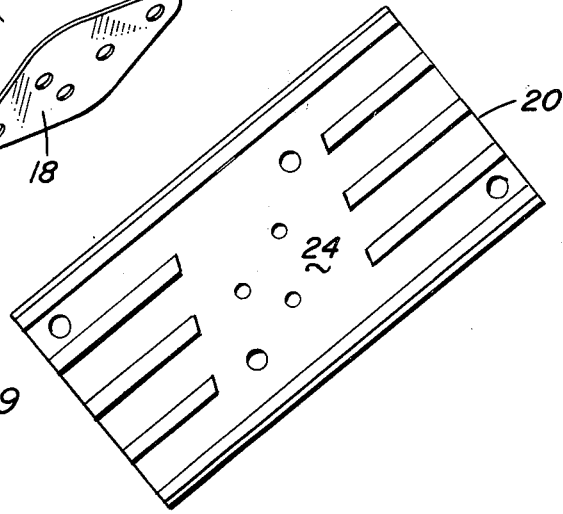
FIG. 9 is a top plan view of a metal heat sink of the kind that is suitable for mounting the semi-conductor device and insulator of FIGS. 7 and 8.

In the invention, a wax-like heat conducting material is combined in one form with a heat conducting material to form a mixture whose purpose is to complete a thermal, conductive path from a heated element to a heat sink. The heated element may be a semi-conductor diode or transistor or integrated circuit device, or the like, which generates sufficient heat during its operation so that some means must be provided for conducting that heat away. A representative device of that kind is shown in FIG. 7 of the drawing where it is designated generally by the reference numeral 10. It is fitted with three conductor leads identified by the reference numerals 12, 14 and 16. The device shown is a voltage regulator which becomes so hot in normal operation as to destroy itself unless some of the heat generated is conducted away. It is mounted in a metal case, and the conductor lead 12 is connected electrically to the case. The other two leads, 14 and 16, are insulated from it. It is often required that the metallic case of the device be insulated from chassis ground potential, and it is often impractical to provide a heat sink mounting structure for the device 10 which is insulated from chassis ground potential. The problem that this creates is solved by interposing an insulator, such as the insulator 18 of FIG. 8, between the device 10 and the heat sink 20 of FIG. 9. The lead wires of the device extend through appropriately placed openings in the insulator 18, and they extend through corresponding larger openings in the heat sink 20. All three items are provided with openings to accommodate fastening members which interconnect the three parts. The fastening element, usually machine screws and nuts, are ordinarily made of conductive material. Some means, not shown here, are commonly provided so that the fastening elements will be insulated from one or the other of the electronic device or the heat sink.

The conductive path for heat extends from the lower face 22 of the semi-conductor device through the thickness of the insulating washer 18 to the surface 24 of the aluminum heat sink 20. While the surface of all of these elements is relatively smooth, on a microscopic scale they are not sufficiently smooth and when placed together a substantial number of microscopic voids can be expected to exist. Such voids will exist at the juncture of the surface 22 with one side of the insulator and at the juncture of the other side of the insulator with the surface 24 of the heat sink.

Since almost any material is a better conductor of heat than air, the addition of any material that will fill those voids, and which does not itself present a long heat path, will contribute to increased conduction of heat from the electronic device. However, a number of materials are available which are good conductors of heat and which can be applied to these several surfaces in a form that will serve to fill the voids with heat conducting material. The invention can use almost any of those known heat conductive materials when they have solid form. Thus, powders of berrylium oxide, zinc oxide, aluminum oxide, and the like, are well known and often used materials and are excellent for use in the invention. They are relatively low cost and effective. They are heat conductors, but they are electrical insulators. To have a heat conductor which is an electrical insulator is an advantage, notwithstanding that an insulator such as insulator 18 is used because such a heat conductor will not create short circuiting as a consequence of excess material remaining at the margins of the insulator.

In some circumstances it is not necessary to provide electrical insulation. In those cases it is preferred to use high thermal conductive metallic powders due to their higher heat conductivity.

The heat conducting material having been selected, it remains to determine how to apply the heat conductive material and have it remain in place. The conventional way to do that has been to mix one of the heat conductive materials into a grease, usually silicone grease, and then to apply the mixture to leave in the mating surfaces when the parts are brought into engagement. The grease is easy to apply, but it is messy, both in the original installation and in the event that servicing and replacement of the parts is required. In the invention, the problem is solved by providing the heat conducting material in a vehicle that is solid at room temperatures, but does not perform an adhering function. The materials of the invention are such, in the preferred form, that they melt at temperatures just above the range of normal room temperatures. Thus, they melt above normal room temperature but below the desired operating temperature of the device. Because of that, it is easy to melt the material in a heater pot similar to a glue pot or solder pot, except that the temperature may be lower. The molten material may be painted on the surfaces to be mated. That mode of operation is possible, and in some instances may be desirable. However, in the preferred mode of practicing the invention, the heat conductive material forms part of a mixture which is easily excoriated. The material oblates when it is rubbed over the surfaces to be mated so that a layer of that material in solid form remains on the surface that has been rubbed with it.

Figure 1:
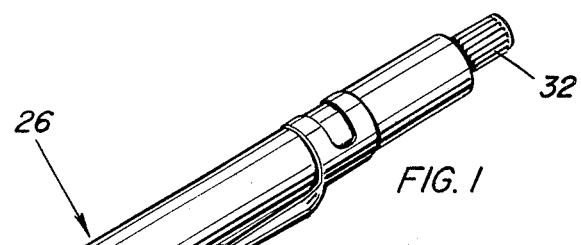
FIG. 1 is an isometric view of an automatic pencil type dispenser in which the material to be dispensed embodies a composition made according to the invention.
Figure 2:
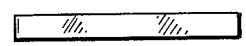
FIG. 2 is a view in side elevation of a rod of replacement heat conducting compound for use in the dispenser of FIG. 1.

Since the material is solid, it can be formed in any shape that makes application by rubbing convenient. In the preferred form, it is shaped as a rod or a bar and it is covered with something that makes it clean and easy to handle. In FIG. 1, a short length of material in rod form is housed in a plastic marker pencil housing of the kind that is often called an automatic pencil. In FIG. 1, the entire structure is identified by the reference numeral 26. The "lead" 28 is a short rod of heat conducting material according to the invention. It extends from the pencil holder 30 in a degree determined by the degree of manipulation of the operator 32, and the end of the rod is rubbed over the surfaces that are to be coated. An example of a refill rod for the holder of FIG. 1 is shown in FIG. 2.

Figure 3:
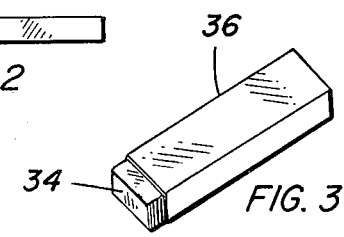
FIG. 3 is an isometric view of a bar of material made according to the invention housed in a rectangular dispensing tube.

An alternative arrangement is shown in FIG. 3. Here, a geometrically-shaped bar 34 of heat conducting material according to the invention is housed in a corresponding geometrically-shaped plastic tube 36. The bar 34 is pushed through the tube with ease so that an appropriate portion of it will extend from the tube. The material of the enclosing tube 36 is sufficiently flexible so that, when held between an operator's fingers, the sides of the tube will yield and be compressed against bar 34. The exposed end will remain exposed as it is rubbed against the surfaces to which the heat conducting material is to be applied.

Figure 4:
FIG. 4 is a view in side elevation of a rod of material made according to the invention packaged in a paper wrapper in marker pencil form.
Figure 5:
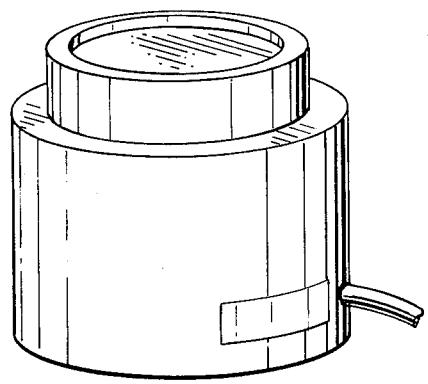
FIG. 5 is an isometric drawing of a heated pot containing a quantity of molten material made according to the invention.
Figure 6:
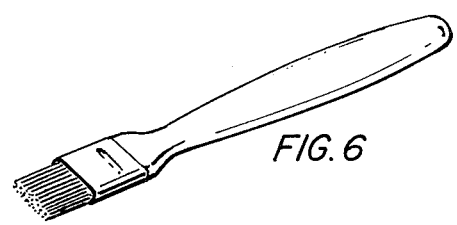
FIG. 6 is an isometric view of a brush suitable for use in applying the material that is heated in the heater pot of FIG. 5.

FIG. 4 shows still another form in which rods of the heat conducting mixture may be packaged. In this case a rod of the material is wrapped in a paper wrapper arranged so that it can be torn in spiral fashion at one end to expose a short length of the heat conducting mixture.

Figure 11:
FIG. 11 is an isometric view of a marking device of another form and made according to the invention.

FIG. 11 shows still another form in which the heat conductive material is formed in the shape of a crayon.

The utility of the invention, to the extent that the mixture is to be applied by rubbing action, depends upon the material being excoriated from the application material and upon a quantity of it adhering in a thin layer to the heat transfer surface. That quality is incorporated in the material of the invention by mixing the heat conductive material with a waxy substance. Waxy substance is defined to include those materials which, like waxes, will ablate when rubbed. They can be excoriated by marking or rubbing, and they melt or become plastic in a temperature range above the range of normal room temperatures. That latter feature is not essential to successful practice of the invention, but it is very advantageous, and it is an important feature of the invention. While the mixture must have solid form in the range of normal room temperatures, it is preferrable that it become plastic or molten at the higher temperatures by the device being protected whereby to ensure that there will be a sufficient filling of all of the voids between the surfaces in the heat conduction path.

The majority of waxes and fats, natural or synthetic, are suitable materials. Beeswax, palm wax, and the mineral waxes, are representative examples. Certain fats exhibit the required characteristics, notwithstanding that they include glycerin. In practice, it is sometimes desirable to include several waxes and fats in combination to avoid any tendency to crumble at the lower room temperatures or to become too plastic at higher room temperatures. Preferred fat for inclusion with true waxes are vegetable oils of the kind that are used for cooking and ordinary petroleum jelly. A number of examples of suitable mixtures are set out below. In each case, the term "parts" means parts by weight.

In one example, material according to the invention has the following composition:

| Material | Parts |
| --- | --- |
| Beeswax | 50 |
| BeO Powder | 30 |
| Petroleum Jelly | 12 |

The beryllium oxide and petroleum jelly are mixed into the beeswax while the latter is maintained in a molten state.

In another example:

| Material | Parts |
| --- | --- |
| Paraffin | 3 |
| Zinc Oxide Powder | 4 |
| Petroleum Jelly | 1 |

These materials may be heated to a molten state at 50° C. to 60° C. and applied with a brush to the heat sink surface to which a power transistor is to be mounted. A quantity of the same material is painted on the mounting surface of the transistor. After the material has cooled to solid form the transistor is mounted on the heat sink with an insulating washer between them. In another example:

| Material | Parts |
| --- | --- |
| Zn O, Al$_2$O$_3$ or Be O | 35–65 |
| Paraffin | 30–65 |

-continued

| Material | Parts |
| --- | --- |
| Petroleum Jelly | 5–20 |

These materials are heated above the melting point of the wax and are combined and thoroughly mixed. Mixing is continued as the mixture is cooled until it approaches solid state. It is compressed while plastic at a temperature a few degrees below melting into a solid mass. The mass is extruded at a lower temperature, but above room temperature, into rod or spaghetti form 0.3 to 0.6 centimeters in diameter. The larger rods are wrapped in paper to pencil shape. The smaller rods are cut to a length of two or four centimeters and packaged for insertion in "automatic" pencil or marker dispensers.

In both the pencil and automatic dispenser form the material is used by rubbing an end of the rod over one of the surfaces to be engaged when an electronic device is mounted on a heat sink. Rubbing continues until the surface is covered by a thin layer of material excoriated from the rod. Thereafter, the electronic device and heat sink are connected. During operation of the apparatus the mixture may become molten. During servicing of the apparatus, when it is cooled and at normal room temperature, the mixture will again become a solid.

In another example, fifty parts by weight of candle wax and fifty parts by weight of aluminum powder are mixed with ten parts by weight of vegetable oil at elevated temperature to produce a uniform mixture. The mixture is then cooled and extruded into bar form. It is covered with a protective covering of removable material. This material is used in the same manner as the material of the preceding example.

For the purpose of this application, the term "normal room temperature" means temperatures between 18° C. and 35° C., and the term "range above normal temperatures" means temperatures between 35° C. and 65° C.

Although we have shown and described certain specific embodiments of our invention, we are fully aware that many modifications thereof are possible. Our invention, therefore, is not to be restricted except insofar as is necessitated by the prior art.

We claim:

1. For application to the surfaces of components of electronic apparatus, a heat conducting material including a substantially uniform mixture, in solid form, of finely divided solid heat conductive material and a waxy material which is solid at normal room temperature; and in which said waxy material comprises an excoriatable combination of wax and petroleum jelly.

2. For application to the surfaces of components of electronic apparatus, a heat conducting material including a substantially uniform mixture, in solid form, of finely divided solid heat conductive material and a waxy material which is solid at normal room temperature;

said mixture comprising 35 to 65 parts by weight of finely divided heat conducting material and 30 to 65 parts by weight of wax; and said mixture comprising from 5 to 35 parts by weight of petroleum jelly.

* * * * *